(12) United States Patent
Zeng

(10) Patent No.: US 10,794,438 B2
(45) Date of Patent: Oct. 6, 2020

(54) LIQUID-RESISTANCE BRAKING SYSTEM

(71) Applicant: Yibo Zeng, Wuhan (CN)

(72) Inventor: Yibo Zeng, Wuhan (CN)

( * ) Notice: Subject to any disclaimer, the term of this patent is extended or adjusted under 35 U.S.C. 154(b) by 44 days.

(21) Appl. No.: 16/159,741

(22) Filed: Oct. 15, 2018

(65) Prior Publication Data

US 2019/0048948 A1  Feb. 14, 2019

Related U.S. Application Data

(63) Continuation-in-part of application No. PCT/CN2017/079673, filed on Apr. 7, 2017.

(30) Foreign Application Priority Data

Apr. 13, 2016 (CN) .......................... 2016 1 0227237
Apr. 13, 2016 (CN) ..................... 2016 2 0304886 U

(51) Int. Cl.
*F16D 57/06* (2006.01)
*F16D 57/00* (2006.01)
*F16F 9/53* (2006.01)

(52) U.S. Cl.
CPC ............. *F16D 57/06* (2013.01); *F16D 57/00* (2013.01); *F16D 57/002* (2013.01); *F16F 9/537* (2013.01)

(58) Field of Classification Search
CPC ........... F16D 57/00; F16D 57/02; F16D 57/03
USPC .................................................. 188/272, 292
See application file for complete search history.

(56) References Cited

U.S. PATENT DOCUMENTS

| 564,246 | A | * | 7/1896 | Gould | F16D 57/06 |
| | | | | | 188/292 |
| 2,845,149 | A | * | 7/1958 | Stern | B60T 8/246 |
| | | | | | 188/195 |
| 5,566,795 | A | * | 10/1996 | Barefoot | B60T 1/087 |
| | | | | | 188/292 |
| 6,135,909 | A | * | 10/2000 | Keiser | F16H 3/722 |
| | | | | | 475/107 |
| 7,341,318 | B2 | * | 3/2008 | Bucci | B60T 1/062 |
| | | | | | 188/152 |

FOREIGN PATENT DOCUMENTS

| FR | 2258563 A1 | * | 8/1975 | ............. | F16D 57/06 |
| GB | 1251536 A | * | 10/1971 | ............. | B66D 5/026 |

* cited by examiner

*Primary Examiner* — Thomas J Williams
(74) *Attorney, Agent, or Firm* — Matthias Scholl P.C.; Matthias Scholl

(57) ABSTRACT

A braking system, including a damper and a brake controller. The damper includes: a sealed gearbox including an inner chamber, at least one pair of engaged gears mated with the inner chamber of the gearbox, and a brake fluid storage box. The at least one pair of engaged gears include a driving gear. A first flowing channel and a second flowing channel are provided on both sides of the gearbox of the at least one pair of engaged gears, respectively. The first flowing channel and the second flowing channel include a first extracting outlet and a second extracting outlet, respectively, which are both disposed on the gearbox. The brake fluid storage box includes a first joint adapting to communicate with the first extracting outlet and a second joint adapting to communicate with the second extracting outlet. The brake controller includes at least one braking switch valve.

9 Claims, 4 Drawing Sheets ly. The first flowing channel and the second flowing channel comprise a first extracting outlet and a second extracting outlet, respectively, which are both disposed on the gearbox. The brake fluid storage box comprises a first joint adapting to communicate with the first extracting outlet via a first connection conduit and a second joint adapting to communicate with the second extracting outlet via a second connection conduit, to form a sealing circulation passage; and the brake controller comprises at least one braking switch valve arranged on the sealing circulation passage and a brake control mechanism. The at least one braking switch valve comprises a control end connected to the brake control mechanism.

LIQUID-RESISTANCE BRAKING SYSTEM

CROSS-REFERENCE TO RELATED APPLICATIONS

This application is a continuation-in-part of International Patent Application No. PCT/CN2017/079673 with an international filing date of Apr. 7, 2017, designating the United States, now pending, and further claims foreign priority benefits to Chinese Patent Application No. 201610227237.2 filed Apr. 13, 2016 and to Chinese Patent Application No. 201620304886.3 filed Apr. 13, 2016. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, Mass. 02142.

BACKGROUND

The disclosure relates to a liquid-resistance braking system.

A conventional friction type braking system is mainly composed of a brake support, a friction element, and a brake releaser. The friction element is gradually consumed during braking and requires periodic replacement. When the friction element wears thin, the effectiveness of the brakes is reduced, and the brakes may fail eventually.

SUMMARY

Disclosed is a liquid-resistance braking system that addresses the above-mentioned problems.

Disclosed is a liquid-resistance braking system, comprising a damper and a brake controller. The damper comprises: a sealed gearbox comprising an inner chamber, at least one pair of engaged gears mated with the inner chamber of the gearbox, and a brake fluid storage box. The at least one pair of engaged gears comprise a driving gear. The driving gear matches a driving axle which is a brake shaft extending out of the gearbox and connecting to an external driving shaft or being an external driving shaft; a first flowing channel and a second flowing channel are provided on both sides of the gearbox of the at least one pair of engaged gears, respectively. The first flowing channel and the second flowing channel comprise a first extracting outlet and a second extracting outlet, respectively, which are both disposed on the gearbox. The brake fluid storage box comprises a first joint adapting to communicate with the first extracting outlet and a second joint adapting to communicate with the second extracting outlet, to form a sealing circulation passage; and the brake controller comprises at least one braking switch valve arranged on the sealing circulation passage and a brake control mechanism. The at least one braking switch valve comprises a control end connected to the brake control mechanism.

The braking switch valve can comprise a first hydraulic switching valve and a second first hydraulic switching valve which can be disposed on the first flowing channel and the second flowing channel, respectively. The first hydraulic switching valve and the second first hydraulic switching valve can be identical in structure, and each comprise a cylindrical housing; both sides of the cylindrical housing can be provided with openings which allow the first flowing channel and the second flowing channel to pass through; a switch sliding plug can be disposed in the cylindrical housing. The switch sliding plug can comprise a radial through hole corresponding to the first/second flowing channel; a reset spring can be disposed between the switch sliding plug and a bottom wall of the cylindrical housing; an outer end of the cylindrical housing can be provided with a driving liquid inlet and a driving liquid outlet; and both the driving liquid inlet and the driving liquid outlet of the first hydraulic switching valve and the second first hydraulic switching valve can be connected to the brake control mechanism.

The brake control mechanism can be a hydraulic driving device and can comprise an oil storage tank, an oil pump and a piston cylinder. The piston cylinder can comprise a control end and an output end. The control end of the piston cylinder can be connected to a brake operation mechanism. The output end of the piston cylinder can be connected to oil inlets of the first hydraulic switching valve and the second hydraulic switching valve via a liquid inlet conduit; oil outlets of the first hydraulic switching valve and the second hydraulic switching valve can be connected to the oil storage tank via a liquid outlet conduit; and the liquid inlet conduit and the liquid outlet conduit can be provided with a liquid inlet solenoid valve and a liquid outlet solenoid valve, respectively.

Also disclosed is a liquid-resistance braking system for an automobile comprising a damper and a brake controller. The damper comprises: a sealed gearbox comprising an inner chamber, at least one pair of engaged gears mated with the inner chamber of the gearbox, and a brake fluid storage box. The at least one pair of engaged gears comprise a driving gear. The driving gear matches a driving axle which is a brake shaft extending out of the gearbox and connecting to an external driving shaft; a first flowing channel and a second flowing channel are provided on both sides of the gearbox of the at least one pair of engaged gears, respectively. The first flowing channel and the second flowing channel comprise a first extracting outlet and a second extracting outlet, respectively, which are both disposed on the gearbox. The brake fluid storage box comprises a first joint adapting to communicate with the first extracting outlet via a first connection conduit and a second joint adapting to communicate with the second extracting outlet via a second connection conduit, to form a sealing circulation passage; and the brake controller comprises at least one braking switch valve arranged on the sealing circulation passage and a brake control mechanism. The at least one braking switch valve comprises a control end connected to the brake control mechanism.

The sealed gearbox can comprise an outer housing fixedly connected to a mounting base of a brake of an automobile. The braking switch valve can comprise a first hydraulic switching valve and a second first hydraulic switching valve which can be disposed on the first flowing channel and the second flowing channel, respectively. The first hydraulic switching valve and the second first hydraulic switching valve can be identical in structure, and each comprise a cylindrical housing; both sides of the cylindrical housing can be provided with openings which allow the first flowing channel and the second flowing channel to pass through; a switch sliding plug can be disposed in the cylindrical housing. The switch sliding plug can comprise a radial through hole corresponding to the first/second flowing channel; a reset spring can be disposed between the switch sliding plug and a bottom wall of the cylindrical housing; an outer end of the cylindrical housing can be provided with a driving liquid inlet and a driving liquid outlet; and both the driving liquid inlet and the driving liquid outlet of the first hydraulic switching valve and the second first hydraulic switching valve can be connected to the brake control mechanism.

The brake control mechanism can be a hydraulic driving device and can comprise an oil storage tank, an oil pump and a piston cylinder. The piston cylinder can comprise a control end and an output end. The control end of the piston cylinder can be connected to a brake operation mechanism which can comprise a brake pedal. The output end of the piston cylinder can be connected to oil inlets of the first hydraulic switching valve and the second hydraulic switching valve via a liquid inlet conduit; oil outlets of the first hydraulic switching valve and the second hydraulic switching valve can be connected to the oil storage tank via a liquid outlet conduit; and the liquid inlet conduit and the liquid outlet conduit can be provided with a liquid inlet solenoid valve and a liquid outlet solenoid valve, respectively.

Further disclosed is a liquid-resistance braking system for a train comprising a damper and a brake controller. The damper comprises: a sealed gearbox comprising an inner chamber, at least one pair of engaged gears mated with the inner chamber of the gearbox, and a brake fluid storage box. The at least one pair of engaged gears comprise a driving gear. The driving gear matches a driving axle which is a brake shaft; a first flowing channel and a second flowing channel are provided on both sides of the gearbox of the at least one pair of engaged gears, respectively. The first flowing channel and the second flowing channel comprise a first extracting outlet and a second extracting outlet, respectively, which are both disposed on the gearbox. The brake fluid storage box communicates with the first extracting outlet via a first connection conduit and the second extracting outlet via a second connection conduit; and the brake controller comprises at least one braking switch valve arranged on the first flowing channel and the second flowing channel or on the first connection conduit and the second connection conduit, and a brake control mechanism. The at least one braking switch valve comprises a control end connected to the brake control mechanism.

The sealed gearbox can be disposed on an axle of a train wheel and can be slidably connected to the axle. The sealed gearbox can comprise an outer housing fixedly connected to a bogie of a train.

A first gearbox and a second gearbox can be respectively disposed at two sides of the bogie of the train, and the brake fluid storage box can be shared by the first gearbox and the second gearbox.

The sealed gearbox can comprise an outer housing fixedly connected to a mounting base of a brake of an automobile. The braking switch valve can comprise a first hydraulic switching valve and a second first hydraulic switching valve which can be disposed on the first flowing channel and the second flowing channel, respectively. The first hydraulic switching valve and the second first hydraulic switching valve can be identical in structure, and each comprise a cylindrical housing; both sides of the cylindrical housing can be provided with openings which allow the first flowing channel and the second flowing channel to pass through; a switch sliding plug can be disposed in the cylindrical housing. The switch sliding plug can comprise a radial through hole corresponding to the first/second flowing channel; a reset spring can be disposed between the switch sliding plug and a bottom wall of the cylindrical housing; an outer end of the cylindrical housing can be provided with a driving liquid inlet and a driving liquid outlet; and both the driving liquid inlet and the driving liquid outlet of the first hydraulic switching valve and the second first hydraulic switching valve can be connected to the brake control mechanism.

The brake control mechanism can be a hydraulic driving device and can comprise an oil storage tank, an oil pump and a piston cylinder. The piston cylinder can comprise a control end and an output end. The control end of the piston cylinder can be connected to a brake operation mechanism which can comprise a brake pedal. The output end of the piston cylinder can be connected to oil inlets of the first hydraulic switching valve and the second hydraulic switching valve via a liquid inlet conduit; oil outlets of the first hydraulic switching valve and the second hydraulic switching valve can be connected to the oil storage tank via a liquid outlet conduit; and the liquid inlet conduit and the liquid outlet conduit can be provided with a liquid inlet solenoid valve and a liquid outlet solenoid valve, respectively.

Advantages of the braking system according to embodiments of the disclosure are summarized as follows: the liquid-resistance braking system has a relatively simple structure, low manufacturing cost, and is safe, reliable, easy to operate and maintain.

Figure 1:
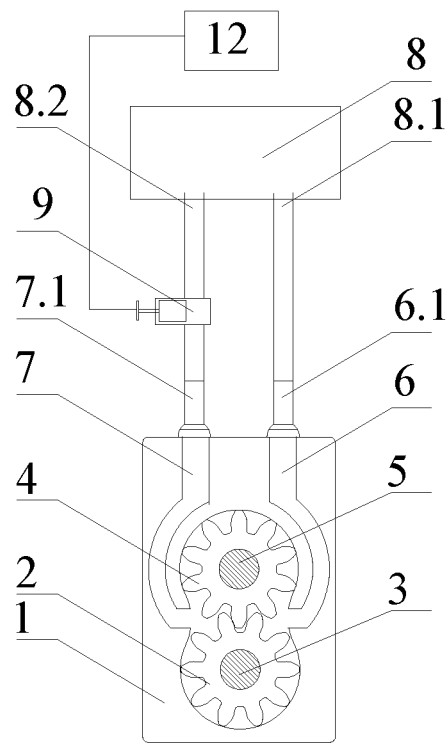
FIG. 1 is a structural schematic diagram of an externally engaged liquid-resistance braking system as described in the disclosure.

In the drawings, the following reference numbers are used: 1—gearbox; 2—driven gear; 3—driven axle; 4—driving gear; 5—driving axle; 6—first flowing channel; 7—second flowing channel; 6.1—first extracting outlet; 7.1—second extracting outlet; 8—brake fluid storage box; 8.1—first joint; 8.2—second joint; 9—braking switch valve; 9a—first hydraulic switching valve; 9b—second hydraulic switching valve; 9.1—cylindrical housing; 9.2—switch sliding plug; 9.3—reset spring; 9.4—driving liquid inlet; 9.5—driving liquid outlet; 9.6—first radial through hole; 9.7—second radial through hole; 10—first connection tube; 11—second connection tube; 12—brake control mechanism; 12.1—oil storage tank; 12.2—oil pump; 12.3—piston cylinder; 12.4—liquid inlet conduit; 12.5—liquid outlet conduit; 12.6—liquid inlet solenoid valve; 12.7—liquid outlet solenoid valve; 13—brake operating mechanism; 14—automobile wheel; 15—external driving shaft; 16—train wheel; 18—handbrake.

DETAILED DESCRIPTION OF THE EMBODIMENTS

As shown in FIG. 1, an externally engaged liquid-resistance braking system comprises a damper and a brake controller. The damper comprises a sealed gearbox 1 fixed to a device body and at least one pair of externally engaged gears which are disposed in the gearbox 1 and are mated with an inner chamber of the gearbox. A driven gear 2 is mounted in the gearbox 1 via a driven axle 3. A driving axle 5 of a driving gear 4 is a brake shaft which extends out of the gearbox and connects to an external driving shaft or is an external driving shaft. A first flowing channel 6 and a second flowing channel 7 are provided on both sides of the gearbox of the externally engaged gear, respectively. A first extracting outlet 6.1 and a second extracting outlet 7.1 are provide on the two flowing channels 6, 7 respectively and the two extracting outlets 6.1, 7.1 are connected to a first joint 8.1 and a second joint 8.2 of a brake fluid storage box 8 to form a sealing circulation passage. The brake controller comprises at least one braking switch valve 9 disposed on the circulation passage. A control end of the braking switch valve 9 is connected to a brake control mechanism 12. The opening and closing state of the braking switch valve 9 is controlled by the brake control mechanism 12 to obtain a deceleration braking.

Figure 2:
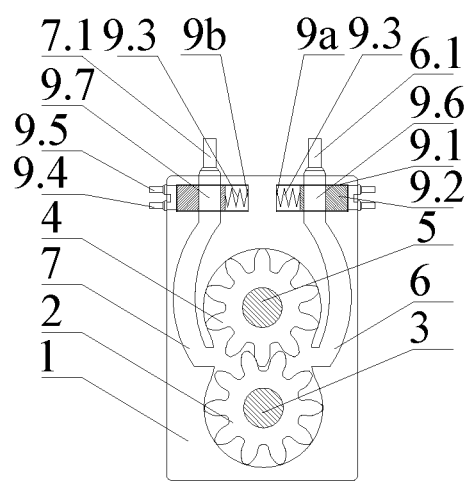
FIG. 2 is a structural schematic diagram of a hydraulic switching valve and a gearbox of an externally engaged liquid-resistance braking system as described in the disclosure.
Figure 3:
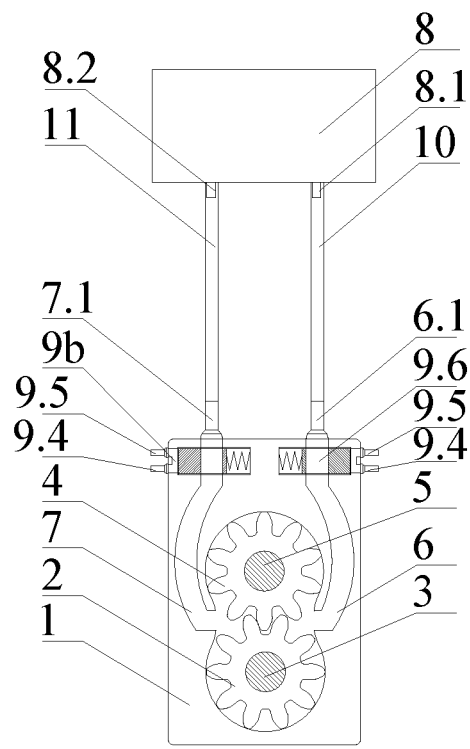
FIG. 3 is a structural schematic diagram of a damper of an externally engaged liquid-resistance braking system as described in the disclosure.

FIG. 2 and FIG. 3 show the hydraulic switching valve, the gearbox and the damper of the externally engaged liquid-resistance braking system of one embodiment of the disclosure.

The braking switch valve 9 is a hydraulic switch and comprises a first hydraulic switching valve 9a and a second first hydraulic switching valve 9b. The two hydraulic switching valves 9a, 9b are respectively disposed on passages of the two flowing channels 6, 7 for respectively controlling the open and close of the flowing channels 6, 7. The two hydraulic switching valves 9a, 9b have the same structure. Both of them comprise a cylindrical housing 9.1. Both sides of the cylindrical housing 9.1 are provided with one opening to communicate with the blocked flowing channel. A switch sliding plug 9.2 is disposed in the cylindrical housing 9.1. A first radial sliding hole 9.6 and a second radial sliding hole 9.7 are respectively provided on the switch sliding plugs 9.2 of the two hydraulic switching valves 9a, 9b and correspond to the two flowing channels 6, 7. A reset spring 9.3 is provided between the switch sliding plug 9.2 and the bottom of the cylinder. An outer end of the cylindrical housing 9.1 is provided with a driving liquid inlet 9.4 and a driving liquid outlet 9.5. Both the driving liquid inlet 9.4 and the driving liquid outlet 9.5 of the two hydraulic switching valves 9a, 9b are connected to a brake control mechanism 12.

Figure 4:
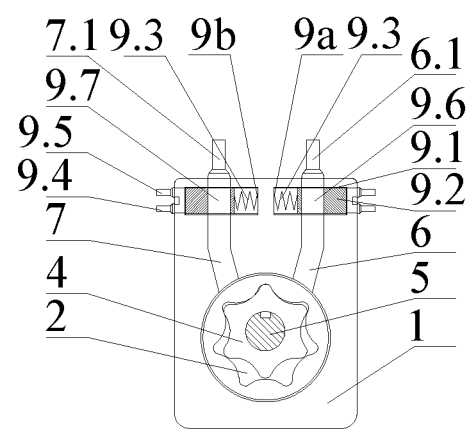
FIG. 4 is a structural schematic diagram of a hydraulic switching valve and a gearbox of an internally engaged liquid-resistance braking system as described in the disclosure.

FIG. 4 is a structural schematic diagram of a hydraulic switching valve and a gearbox of an internally engaged liquid-resistance braking system according to this disclosure. The structure of the internally engaged liquid-resistance braking system is similar to the structure of the externally engaged liquid-resistance braking system except for the following structures. An internally engaged driven gear 2 inside a gearbox 1 is an internal ring gear embedded in the gearbox. A driving axle 5 of a driving gear 4 is a brake shaft extending out of the gearbox to connect to an external driving shaft or is an external driving shaft. Other configurations, such as the hydraulic switching valve of the internally engaged liquid-resistance braking system, are similar to those of the externally engaged liquid-resistance braking system.

Figure 5:
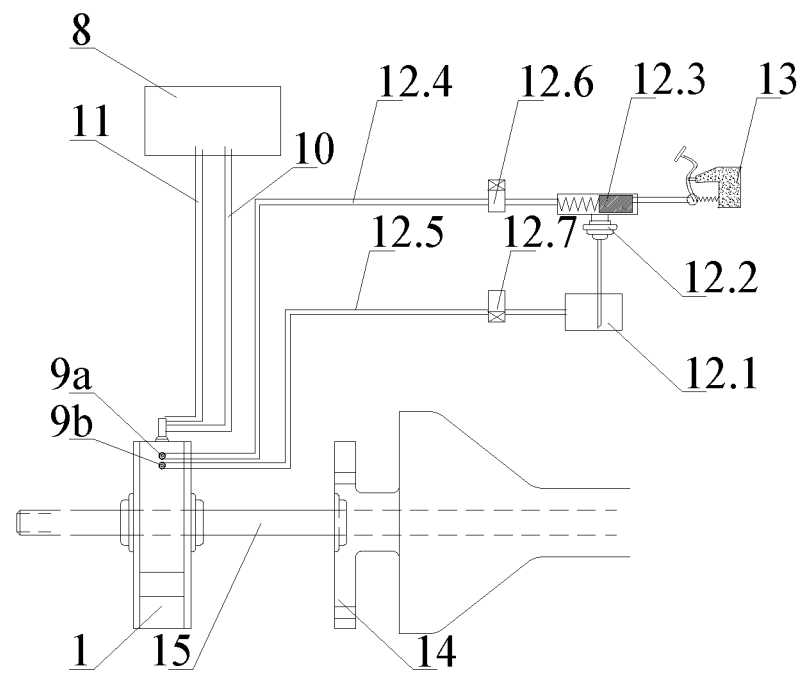
FIG. 5 is a structural schematic diagram of a liquid-resistance braking system for an automobile as described in the disclosure.

FIG. 5 is a structural schematic diagram of a liquid-resistance braking system for an automobile according to one embodiment of the disclosure.

The braking system comprises a damper and a brake controller. The damper comprises a sealed gearbox 1. The outer housing of the sealed gearbox is fixed to a brake mounting base and at least one pair of externally engaged gears which are disposed in the gearbox 1 and are mated with the inner chamber of the gearbox. When the engaged gears inside the gearbox are externally engaged, a driven axle 3 of a driven gear 2 is mounted in the gearbox 1. A driving axle 5 of a driving gear 4 is a brake shaft and is coaxial with an axle of a train wheel 16. When the engaged gears in the gearbox are internally engaged, the driven gear 2 is an internal ring gear embedded in the gearbox. The driving axle 5 of the driving gear 4 is a brake shaft which extends out of the gearbox and connects to an external driving shaft or is an external driving shaft.

A first flowing channel 6 and a second flowing channel 7 are respectively provided on both sides of the gearbox of the engaged gears. A first extracting outlet 6.1 and a second extracting outlet 7.1 are respectively provided on the two flowing channels 6, 7. The two extracting outlets 6.1, 7.1 are respectively connected to a first joint 8.1 and a second joint 8.2 of a brake fluid storage box 8 via a first connection tube 10 and a second connection tube 11 to form a brake fluid sealing circulation passage. The hydraulic switching valve, the structure of the gearbox and the damper shown in FIGS. 2-3 are applied. A braking switch valve 9 comprises a first hydraulic switching valve 9a and a second hydraulic switching valve 9b. The two hydraulic switching valves 9a, 9b are respectively disposed on the passages of the two flowing channels 6, 7 for respectively controlling the opening and closing of the flowing channels 6, 7. The two hydraulic switching valves 9a, 9b have the same structure. Each cylindrical housing comprises a cylindrical housing 9.1. Both sides of the cylindrical housing 9.1 are provided with openings for allowing the first and second flowing channels to pass through. A switch sliding plug 9.2 is disposed in the cylindrical housing 9.1. The switch sliding plugs 9.2 of the two hydraulic switching valves 9a, 9b are respectively provided with a first radial through hole 9.6 and a second radial through hole 9.7 which correspond to the two flowing channels 6, 7. A reset spring 9.3 is provided between the switch sliding plug 9.2 and the bottom of the cylinder. An outer end of the cylindrical housing 9.1 is provided with a driving liquid inlet 9.4 and a driving liquid outlet 9.5. Both the driving liquid inlet 9.4 and the driving liquid outlet 9.5 of the two hydraulic switching valves 9a, 9b are connected to a brake control mechanism 12. The opening and closing state of the two braking switch valves 9a, 9b are controlled by the brake control mechanism 12 to obtain a deceleration braking.

The brake control mechanism 12 is a hydraulic driving device, and it comprises an oil storage tank 12.1, an oil pump 12.2 and a piston cylinder 12.3, which are connected in sequence. A brake operation mechanism 13 of the piston cylinder 12.3 is a brake pedal. An output end of the piston cylinder 12.3 is connected to oil inlets of the first hydraulic switching valve 9a and the second hydraulic switching valve 9b via a liquid inlet conduit 12.4. Oil outlets of the first hydraulic switching valve 9a and the second hydraulic switching valve 9b are connected to the oil storage tank 12.1 via a liquid outlet conduit 12.5. A liquid inlet solenoid valve 12.6 and a liquid outlet solenoid valve 12.7 are respectively disposed on the liquid inlet conduit 12.4 and the liquid outlet conduit 12.5. The liquid inlet solenoid valve 12.6 and the liquid outlet solenoid valve 12.7 are used as electrical control switches.

Figure 6:
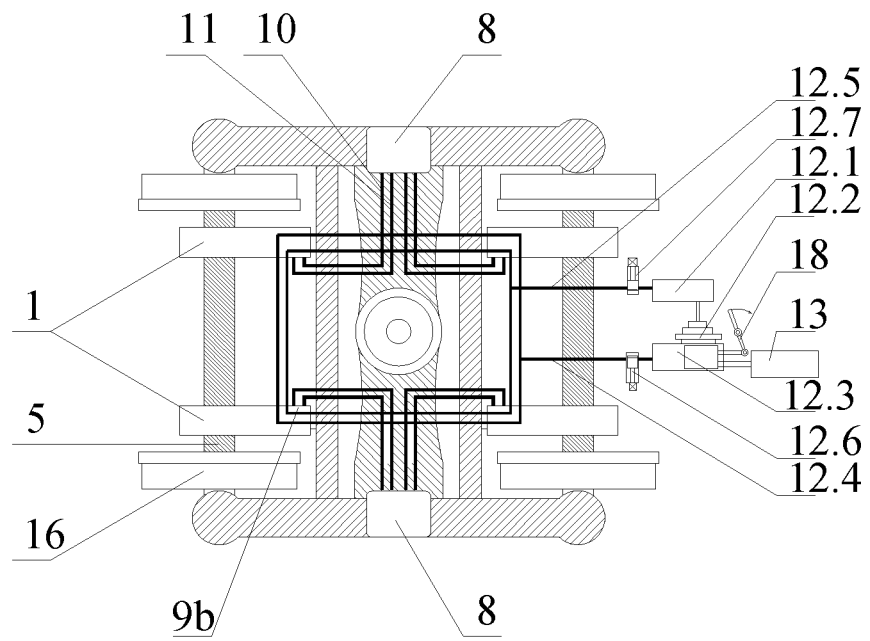
FIG. 6 is a structural schematic diagram of a liquid-resistance braking system for a train as described in the disclosure.

FIG. 6 shows a liquid-resistance braking system for a train.

The liquid-resistance braking system for a train comprises a damper and a brake controller. The damper comprises a sealed gearbox 1 corresponding to each train wheel. The gearbox 1 is provided on an axle of the train wheel 16 and is connected to the axle in a form of sliding sealing connection. The outer housing of the gearbox 1 is fixed to a bogie of a carriage. When the engaged gears inside the gearbox are externally engaged, a driven axle 3 of a driven gear 2 is mounted in the gearbox 1. A driving axle 5 of a driving gear 4 is a brake shaft and is coaxial with an axle of a train wheel 16. When the engaged gears in the gearbox are internally engaged, the driven gear 2 is an internal ring gear embedded in the gearbox. The driving axle 5 of the driving gear 4 is a brake shaft which extends out of the gearbox and connects to an external driving shaft or is an external driving shaft.

A first flowing channel 6 and a second flowing channel 7 are provided on both sides of the gearbox of the engaged gears. A first extracting outlet 6.1 and a second extracting outlet 7.1 are respectively provide on the two flowing channels 6, 7 in the gearbox and the two extracting outlets 6.1, 7.1 are connected to a brake fluid storage box 8 via a first connection tube 10 and a second connection tube 11. The brake fluid storage box 8 is provided on the bogie. The brake controller comprises a braking switch valve 9 disposed on the two flowing channels 6, 7 or the two connection tubes 10, 11. A control end of the braking switch valve 9 is connected to a train brake control mechanism 12. The opening and closing state of the braking switch valve 9 are controlled by the train brake control mechanism 12 to obtain a deceleration braking.

A first gearbox and a second gearbox are respectively provided on two sides of the same bogie of the train. One brake fluid storage box is shared by the gearboxes on the same side.

Figure 7:
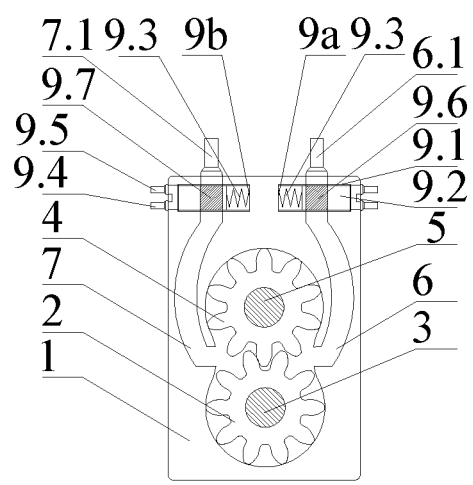
FIG. 7 is a structural schematic diagram of a hydraulic switching valve and a gearbox of an externally engaged liquid-resistance braking system for a train as described in the disclosure.

FIG. 7 is a structural schematic diagram of a hydraulic switching valve and a gearbox of an externally engaged liquid-resistance braking system for a train.

A braking switch valve 9 employs a hydraulic switch and it comprises a first hydraulic switching valve 9a and a second hydraulic switching valve 9b which are respectively disposed on a first flowing channel 6 and a second flowing channel 7. The two hydraulic switching valves 9a, 9b are respectively provided on the passages of the two flowing channels 6, 7 for controlling the opening and closing of the two flowing channels 6, 7. The two hydraulic switching valves 9a, 9b are identical in structure. Both a driving liquid inlet 9.4 and a driving liquid outlet 9.5 of the two hydraulic switching valves 9a, 9b are connected to a hydraulic driving device 12. The initial state of the two hydraulic switching valves 9a, 9b for the train is opposite to that of the hydraulic switching valve for the automobile, and the initial state is closed.

As shown in FIG. 5 and FIG. 6, a brake control mechanism 12 is a hydraulic driving device, and it comprises an oil storage tank 12.1, an electrical oil pump 12.2 and a piston cylinder 12.3, which are connected in sequence. The piston cylinder 12.3 is controlled by a brake operation mechanism 13. An output end of the piston cylinder 12.3 is connected to oil inlets of the first hydraulic switching valve 9a and the second hydraulic switching valve 9b via a liquid inlet conduit 12.4. Oil outlets of the first hydraulic switching valve 9a and the second hydraulic switching valve 9b are connected to the oil storage tank 12.1 via a liquid outlet conduit 12.5. A liquid inlet solenoid valve 12.6 and a liquid outlet solenoid valve 12.7 are respectively disposed on the liquid inlet conduit 12.4 and the liquid outlet conduit 12.5. The liquid inlet solenoid valve 12.6 and the liquid outlet solenoid valve 12.7 are used as electrical control switches.

The deceleration braking process of the liquid-resistance braking system for an automobile is as follows.

During a normal operation, the first hydraulic switching valve 9a and the second hydraulic switching valve 9b are opened. When the automobile needs to be braked in an emergency, the brake operating mechanism 13, namely the brake pedal, is manually pressed. An Electronic Control Unit (ECU) outputs an emergency brake signal to the liquid inlet solenoid valve 12.6 and the liquid outlet solenoid valve 12.7 for opening the liquid inlet solenoid valve 12.6 and closing the liquid outlet solenoid valve 12.7. The driving fluid is introduced into the first hydraulic switching valve 9a and the opening degree of the hydraulic switching valve 9a is gradually reduced until the hydraulic switching valve 9a is closed. Since the first hydraulic switching valve 9a is closed, the circulation flowing of the brake fluid is blocked. The brake fluid in the gearbox is discharged. The pressure of the sealed circulation passage is gradually increased. The reacting force acted on the surface of the gear is gradually increased when the gear engages and rotates, so that the rotational speed of the gear is gradually decreased. The rotational speed of the axle of the automobile 15 is decreased until it stops. When the automobile is reversed, the second hydraulic switching valve 9b is closed to obtain a braking action. The principle is the same as above.

In the actual application process, due to the long duration of the normal running of the automobile, considering the long-term circulation of the brake fluid in the brake fluid circulation passage will cause the temperature of the brake fluid to be increased, a solenoid valve can be provided on the connection tubes by which the corresponding brake fluid enters to the gearbox when the automobile is normally moving forward. The solenoid valve is controlled by the Electronic Control Unit (ECU). When the automobile is normally moving forward, the solenoid valve is closed, thereby preventing the brake fluid from entering into the gearbox during a normal forward moving of the automobile, and thus finally avoids the affect caused by the long-term alternation of the brake fluid. When it is necessary to brake in an emergency, the solenoid valve is opened by a control of the Electronic Control Unit (ECU). The brake fluid enters to the gearbox. The rotation of the brake shaft is prevented by the resistance of the circulation flowing of the brake fluid in the gearbox, thereby obtaining the braking.

The implementation of an anti-lock braking system (ABS) is as follows. The liquid-resistance braking system for an automobile is realized by providing the liquid inlet solenoid valve 12.6 and the liquid outlet solenoid valve 12.7 on the liquid inlet conduit 12.4 and the liquid outlet conduit 12.5 respectively. The electrical pump 12.2 is arranged between the piston cylinder 12.3 and the liquid storage tank 12.1. When the speed of the automobile is dropped to a setting value, the Electronic Control Unit (ECU) sends an instruction to close the liquid inlet solenoid valve 12.6 for cutting off the drive liquid and simultaneously open the liquid outlet solenoid valve 12.7 for discharging the drive liquid in the chambers of the first hydraulic switching valve 9a and the second hydraulic switching valve 9b to the liquid storage tank 12.1. Meanwhile, the first hydraulic switching valve 9a and the second hydraulic switching valve 9b are opened by the reset spring and the braking disappears immediately.

The principle of the deceleration braking of the train is similar to that of the automobile.

The differences between the liquid-resistance braking system for a train and the liquid-resistance braking system for an automobile are as follows. (1) The setting of the hydraulic switching valve is opposite to that of the automobile. The initial states of the two hydraulic switching valves 9a, 9b for the train are closed. When the train normally moves, the first hydraulic switching valve 9a and the second hydraulic switching valve 9b are opened by the control of the brake control mechanism 12. When the deceleration braking is required, the brake operating mechanism 13, namely a control system for a train, sends a braking instruction to start the following operations. The liquid inlet solenoid valve 12.6 is closed for preventing the drive liquid from entering and the liquid outlet solenoid valve 12.7 is opened for discharging the drive liquid in the chambers of the first hydraulic switching valve 9a and the second hydraulic switching valve 9b to the liquid storage tank 12.1. At the same time, the first hydraulic switching valve 9a and the second hydraulic switching valve 9b are reset by the action of the reset spring. The first hydraulic switching valve 9a and the second hydraulic switching valve 9b are closed to achieve the braking. (2) In respect of the setting of the brake fluid storage box 8, one brake fluid storage box 8 is shared by the gearbox on the same side of the same bogie of each train. (3) When the carriages of the train need to be parked for a long time, a hand brake 18 can be operated to achieve the braking.

In the liquid-resistance braking system of this disclosure, according to the practical situation, the first hydraulic switching valve 9a and the second hydraulic switching valve 9b are gradually controlled by the piston cylinder 12.3 from being fully opened to being closed, thereby controlling the brake speed of the brake shaft. Arbitrary braking characteristic curves required by the device are formed to meet the actual requirements.

It will be obvious to those skilled in the art that changes and modifications may be made, and therefore, the aim in the appended claims is to cover all such changes and modifications.

What is claimed is:

1. A braking system, comprising:
   a damper; and
   a brake controller;
   wherein:
   the damper comprises a sealed gearbox comprising an inner chamber, at least one pair of engaged gears mated with the inner chamber of the sealed gearbox, and a brake fluid storage box;
   the at least one pair of engaged gears comprise a driving gear; the driving gear matches a driving axle which is a brake shaft extending out of the sealed gearbox and connecting to an external driving shaft or being an external driving shaft;
   a first flowing channel and a second flowing channel are provided on both sides of the sealed gearbox, respectively;
   the first flowing channel and the second flowing channel comprise a first extracting outlet and a second extracting outlet, respectively, which are both disposed on the sealed gearbox;
   the brake fluid storage box comprises a first joint and a second joint the first joint is connected to the first extracting outlet and the second joint is connected to the second extracting outlet, so as to form a sealing circulation passage;
   the brake controller comprises at least one braking switch valve arranged on the sealing circulation passage and a brake control mechanism; the at least one braking switch valve comprises a control end connected to the brake control mechanism;
   the braking switch valve comprises a first hydraulic switching valve and a second first hydraulic switching valve which are disposed on the first flowing channel and the second flowing channel, respectively;
   the first hydraulic switching valve and the second first hydraulic switching valve are identical in structure, and each comprises a cylindrical housing;
   two sides of each cylindrical housing are provided with openings which allow the first flowing channel and the second flowing channel to pass through;
   a switch sliding plug is disposed in each cylindrical housing; each switch sliding plug comprises a radial through hole corresponding to the first/second flowing channel;
   a reset spring is disposed between each switch sliding plug and a bottom wall of the corresponding cylindrical housing; an outer end of each cylindrical housing is provided with a driving liquid inlet and a driving liquid outlet; and
   both the driving liquid inlet and the driving liquid outlet of the first hydraulic switching valve and the second first hydraulic switching valve are connected to the brake control mechanism.

2. The system of claim 1, wherein:
   the brake control mechanism is a hydraulic driving device and comprises an oil storage tank, an oil pump and a piston cylinder;
   the piston cylinder comprises a control end and an output end;
   the control end of the piston cylinder is connected to a brake operation mechanism;
   the output end of the piston cylinder is connected to oil inlets of the first hydraulic switching valve and the second hydraulic switching valve via a liquid inlet conduit;
   oil outlets of the first hydraulic switching valve and the second hydraulic switching valve are connected to the oil storage tank via a liquid outlet conduit; and
   the liquid inlet conduit and the liquid outlet conduit are provided with a liquid inlet solenoid valve and a liquid outlet solenoid valve, respectively.

3. The system of claim 1, wherein: the sealed gearbox comprises an outer housing fixedly connected to a mounting base of a brake of an automobile.

4. The system of claim 3, wherein:
   the brake control mechanism is a hydraulic driving device and comprises an oil storage tank, an oil pump and a piston cylinder;
   the piston cylinder comprises a control end and an output end;
   the control end of the piston cylinder is connected to a brake operation mechanism which comprises a brake pedal;
   the output end of the piston cylinder is connected to oil inlets of the first hydraulic switching valve and the second hydraulic switching valve via a liquid inlet conduit;

oil outlets of the first hydraulic switching valve and the second hydraulic switching valve are connected to the oil storage tank via a liquid outlet conduit; and the liquid inlet conduit and the liquid outlet conduit are provided with a liquid inlet solenoid valve and a liquid outlet solenoid valve, respectively.

5. A braking system, comprising:
a damper; and
a brake controller;
wherein:
the damper comprises a sealed gearbox comprising an inner chamber, at least one pair of engaged gears mated with the inner chamber of the sealed gearbox, and a brake fluid storage box;
the at least one pair of engaged gears comprise a driving gear; the driving gear matches a driving axle which is a brake shaft extending out of the sealed gearbox and connecting to an external driving shaft or being an external driving shaft;
a first flowing channel and a second flowing channel are provided on both sides of the sealed gearbox, respectively;
the first flowing channel and the second flowing channel comprise a first extracting outlet and a second extracting outlet, respectively, which are both disposed on the sealed gearbox;
the brake fluid storage box comprises a first joint and a second joint the first joint is connected to the first extracting outlet and the second joint is connected to the second extracting outlet, so as to form a sealing circulation passage;
the brake controller comprises at least one braking switch valve arranged on the sealing circulation passage and a brake control mechanism; the at least one braking switch valve comprises a control end connected to the brake control mechanism;
the brake control mechanism is a hydraulic driving device and comprises an oil storage tank, an oil pump and a piston cylinder;
the piston cylinder comprises a control end and an output end;
the control end of the piston cylinder is connected to a brake operation mechanism;
the output end of the piston cylinder is connected to oil inlets of a first hydraulic switching valve and a second hydraulic switching valve via a liquid inlet conduit;
oil outlets of the first hydraulic switching valve and the second hydraulic switching valve are connected to the oil storage tank via a liquid outlet conduit; and
the liquid inlet conduit and the liquid outlet conduit are provided with a liquid inlet solenoid valve and a liquid outlet solenoid valve, respectively.

6. A braking system, comprising:
a damper; and
a brake controller;
wherein:
the damper comprises a sealed gearbox comprising an inner chamber, at least one pair of engaged gears mated with the inner chamber of the sealed gearbox, and a brake fluid storage box;
the at least one pair of engaged gears comprise a driving gear; the driving gear matches a driving axle which is a brake shaft;
a first flowing channel and a second flowing channel are provided on both sides of the sealed gearbox, respectively;
the first flowing channel and the second flowing channel comprise a first extracting outlet and a second extracting outlet, respectively, which are both disposed on the sealed gearbox;
the brake fluid storage box communicates with the first extracting outlet via a first connection conduit and the second extracting outlet via a second connection conduit;
the brake controller comprises at least one braking switch valve arranged on the first flowing channel and the second flowing channel or on the first connection conduit and the second connection conduit, and a brake control mechanism; the at least one braking switch valve comprises a control end connected to the brake control mechanism;
the sealed gearbox is disposed on an axle of a train wheel and is slidably connected to the axle; the sealed gearbox comprises an outer housing fixedly connected to a bogie of a train;
the braking switch valve comprises a first hydraulic switching valve and a second first hydraulic switching valve which are disposed on the first flowing channel and the second flowing channel, respectively;
the first hydraulic switching valve and the second first hydraulic switching valve are identical in structure, and each comprises a cylindrical housing;
two sides of each cylindrical housing are provided with openings which allow the first flowing channel and the second flowing channel to pass through;
a switch sliding plug is disposed in each cylindrical housing; each switch sliding plug comprises a radial through hole corresponding to the first/second flowing channel;
a reset spring is disposed between each switch sliding plug and a bottom wall of the corresponding cylindrical housing; an outer end of each cylindrical housing is provided with a driving liquid inlet and a driving liquid outlet; and
both the driving liquid inlet and the driving liquid outlet of the first hydraulic switching valve and the second first hydraulic switching valve are connected to the brake control mechanism.

7. The system of claim 6, wherein:
a first gearbox and a second gearbox are respectively disposed at two sides of the bogie of the train, and the brake fluid storage box is shared by the first gearbox and the second gearbox.

8. The system of claim 7, wherein:
the brake control mechanism is a hydraulic driving device and comprises an oil storage tank, an oil pump and a piston cylinder;
the piston cylinder comprises a control end and an output end;
the control end of the piston cylinder is connected to a brake operation mechanism which comprises a brake pedal;
the output end of the piston cylinder is connected to oil inlets of the first hydraulic switching valve and the second hydraulic switching valve via a liquid inlet conduit;
oil outlets of the first hydraulic switching valve and the second hydraulic switching valve are connected to the oil storage tank via a liquid outlet conduit; and
the liquid inlet conduit and the liquid outlet conduit are provided with a liquid inlet solenoid valve and a liquid outlet solenoid valve, respectively.

9. The system of claim 6, wherein:
the brake control mechanism is a hydraulic driving device and comprises an oil storage tank, an oil pump and a piston cylinder;
the piston cylinder comprises a control end and an output end;
the control end of the piston cylinder is connected to a brake operation mechanism which comprises a brake pedal;
the output end of the piston cylinder is connected to oil inlets of the first hydraulic switching valve and the second hydraulic switching valve via a liquid inlet conduit;
oil outlets of the first hydraulic switching valve and the second hydraulic switching valve are connected to the oil storage tank via a liquid outlet conduit; and
the liquid inlet conduit and the liquid outlet conduit are provided with a liquid inlet solenoid valve and a liquid outlet solenoid valve, respectively.

* * * * *